United States Patent
Perakis

(10) Patent No.: US 7,036,866 B2
(45) Date of Patent: May 2, 2006

(54) RETRACTABLE ROOF FOR PASSENGER VEHICLES, ESPECIALLY A HARD TOP TWO-SEATER CONVERTIBLES ROADSTERS, OR SIMILAR

(76) Inventor: Petros Perakis, Kantstrasse 131, Berlin (DE)

( * ) Notice: Subject to any disclaimer, the term of this patent is extended or adjusted under 35 U.S.C. 154(b) by 0 days.

(21) Appl. No.: 10/507,797

(22) PCT Filed: Mar. 7, 2003

(86) PCT No.: PCT/DE03/00806

§ 371 (c)(1),
(2), (4) Date: Sep. 13, 2004

(87) PCT Pub. No.: WO03/076223

PCT Pub. Date: Sep. 18, 2003

(65) Prior Publication Data

US 2005/0127706 A1    Jun. 16, 2005

(30) Foreign Application Priority Data

Mar. 12, 2002    (DE) ................. 102 12 574

(51) Int. Cl.
*B60J 7/04*    (2006.01)
*B60J 7/057*    (2006.01)
*B60R 21/13*    (2006.01)

(52) U.S. Cl. .............................. 296/107.2; 296/107.19; 296/107.08; 296/107.03; 296/107.07; 280/756

(58) Field of Classification Search ........... 296/107.2, 296/107.08, 107.03, 107.19, 107.07, 146.14; 280/756

See application file for complete search history.

(56) References Cited

U.S. PATENT DOCUMENTS

| | | | | | |
|---|---|---|---|---|---|
| 1,264,804 | A | * | 4/1918 | Jacobs ................ | 296/107.17 |
| 2,013,314 | A | * | 9/1935 | Metz .................. | 296/107.2 |
| 2,057,907 | A | * | 10/1936 | Nasarevich ......... | 296/107.2 |
| 2,782,070 | A | * | 2/1957 | Chaban ............. | 296/107.2 |
| 2,785,922 | A | * | 3/1957 | Chika ............... | 296/107.2 |
| 4,543,747 | A | * | 10/1985 | Kaltz et al. ....... | 49/249 |
| 4,676,524 | A | * | 6/1987 | Ball et al. ........ | 280/756 |
| 5,056,857 | A | * | 10/1991 | Ney et al. ......... | 296/107.2 |
| 5,078,447 | A | * | 1/1992 | Klein et al. ...... | 296/107.2 |

(Continued)

FOREIGN PATENT DOCUMENTS

DE        36 32 058        4/1988

(Continued)

*Primary Examiner*—Patricia L. Engle
*Assistant Examiner*—Greg Blankenship
(74) *Attorney, Agent, or Firm*—Herbert Dubno; Andrew Wilford

(57) ABSTRACT

A convertible motor vehicle has a seat, a trunk behind the seat, and a storage compartment extending transversely of the direction behind the seat and forward of the trunk and extending laterally of the seat in the direction forward past the seat. An arcuate and rigid roof shell has two rear end posts defining a rear opening and riding via slides in guide rails laterally spacedly flanking the seat and extending from the compartment in the direction forward past the seat. The roof can move along the guide rails between an up position wholly out of the storage compartment and a down position wholly in the compartment with the guide slides laterally flanking the seat. A rear windshield displaceable between a lowered position in the storage compartment and a raised position fitting between the rear end posts of the windshield in the up position thereof and closing the rear opening.

15 Claims, 13 Drawing Sheets

FBS

U.S. PATENT DOCUMENTS

| | | | |
|---|---|---|---|
| 5,265,930 A * | 11/1993 | Klein et al. | 296/107.17 |
| 5,558,388 A * | 9/1996 | Furst et al. | 296/107.2 |
| 5,944,378 A * | 8/1999 | Mather et al. | 296/219 |
| 6,312,042 B1 * | 11/2001 | Halbweiss et al. | 296/108 |
| 6,318,793 B1 * | 11/2001 | Rapin et al. | 296/107.17 |
| 6,582,009 B1 * | 6/2003 | Wezyk et al. | 296/180.1 |
| 6,669,201 B1 * | 12/2003 | Guillez et al. | 296/220.01 |
| 6,672,658 B1 * | 1/2004 | De Gaillard | 296/220.01 |
| 6,676,192 B1 * | 1/2004 | Marold et al. | 296/107.19 |
| 6,808,222 B1 * | 10/2004 | Quindt | 296/108 |
| 6,827,392 B1 * | 12/2004 | Doncov et al. | 296/147 |
| 2004/0041434 A1 * | 3/2004 | Guillez | 296/107.2 |

FOREIGN PATENT DOCUMENTS

| | | |
|---|---|---|
| DE | 41 00 240 | 3/1992 |
| DE | 43 24 708 | 1/1995 |
| DE | 44 46 799 | 6/1996 |
| DE | 102 12 574 B | 10/2002 |
| DE | 102 12 574 A | 10/2003 |

* cited by examiner

RETRACTABLE ROOF FOR PASSENGER VEHICLES, ESPECIALLY A HARD TOP TWO-SEATER CONVERTIBLES ROADSTERS, OR SIMILAR

CROSS REFERENCE TO RELATED APPLICATIONS

This application is the US national phase of PCT application PCT/DE03/00806, filed 7 Mar. 2003, published 18 Sep. 2003 as WO 03/076223, and claiming the priority of German patent application 10212574.0 itself filed 12 Mar. 2002.

FIELD OF THE INVENTION

The invention relates to a retractile car roof, in particular a hard top for a two-seater convertible, roadster, or the like, the roof having an arcuate rigid shell, a rear window for a window opening in the rear roof part, a storage compartment extending transversely of the vehicle axis immediately behind the seats and into and out of which the roof part its guide and drive means can move, the main roof part being guided on rails into its storage compartment.

BACKGROUND OF THE INVENTION

German 36 342 058 and EP 0,261,379 describe a closable roof for a car having a one-piece rigid and stable roof element having when raised a generally horizontal upper roof region and side parts extending downwardly and back relative to the car and a pair of pivots on each of the two side parts or the rear of the roof that in a raised position of the roof are spaced apart somewhat below the vehicle body and that have a pair guide rails symmetrically on each of the two sides of the vehicle in which the pivots engage. The two guide rails of each pair have their upper ends spaced apart with the respective pivots and extend from there downward along similar paths so that their spacing decreases going down so as to produce an opening movement where the upper roof part is raised and then on further movement is dropped while generally vertical into its lower end position. The pivots in a first movement phase are moved in the guide rails downwardly along an arc so that the roof tips up with the upper roof part and the rear part pivots downward. The two rails that are fixed inside the car on the inside and that guide projections of the side parts via their pivots takes up quite a bit of space behind the seats and into the trunk area. Furthermore canting of the various guide elements is possible as a result of the difficult force distribution during opening and closing.

German 43 24 708 discloses a lowerable roof for cars, in particular for two-seater convertibles, having a shell forming a roof plate and rear roof posts and movable into a storage compartment between side walls of the vehicle body to which end it is oriented in a vehicle plane, forming a window opening for a rear window between a rear edge of the roof plate and the posts, and provided with guides for moving the roof plate and rear window so that the rear window can move from a lowered position relative to the roof plate into a lower position in which its edges are closely juxtaposed with the roof plate. The roof shell can drop down in lateral storage compartments via guides that are independent of the guides of the rear window and longitudinally slidable in the roof shell.

The two guide rails on the inner wall of the car that guide pivots or pins take up a great deal of space behind the seat and into the trunk area. In addition canting of the various guide elements is possible as a result of how the forces are applied during opening and closing. High surface pressures are created that make it difficult to operate the roof.

In addition German 40 38 074 describes a lowerable roof for cars, in particular a hard roof for a convertible, having roof posts to each side of a rear window of the roof that seen from the side with a storage position of the lower roof in a storage compartment in which the forward longitudinal regions of the roof form an obtuse angle underneath the roof posts and into which the roof can be lowered in which case the roof is tipped into the storage compartment. The rear window forms with the roof raised between the roof posts the rear part of the roof and can be moved from this position into a storage position in which with the roof lowered it is stowed above the lower ends of the roof posts. The roof is mounted on the motor-vehicle body by a pair of linkages that symmetrically flank the vehicle center plane and whose upper ends are pivoted at lower ends of the roof posts and that each include at least one guide link extending along an angled line to the rear window that is pivoted at its upper edge on the roof and at its lower end on the body of the vehicle. With this known solution parts of the passenger compartment are taken up by the lowering and raising process as a result of the relatively bulky linkages. The linkages are also mechanically expensive and failure-prone.

U.S. Pat. No. 2,191,269 describes a lowerable roof without rear posts for a convertible, wherein a raising and lowering mechanism formed by large and small rollers is provide that extends behind and partially below the seats. The raising and lowering mechanism is very likely to jam as a result of the roller drive and takes up all the space behind the seats.

All the known lowerable roof of the prior art achieve the required structural rigidity by being relatively massive, and are mechanically complex and expensive.

OBJECT OF THE INVENTION

It is an object of the invention, in view of this state of the art, to improve on a lowerable roof of the above-described type such that the necessary structural rigidity is achieved with less weight, easier operation, and more mechanical simplicity and usability while also taking up less space.

SUMMARY OF THE INVENTION

This object is achieved by a roof of the above-described type wherein the storage compartment for the roof part extends to immediately adjacent the seats and rear ends of the roof part fit laterally to the sides of the seats. This is made possible in that the storage compartment which follows the movement arc has the generally shape of an envelope curve and the guide rails are fixed on upright support plates fixed to the vehicle body and extending parallel to the vehicle longitudinal axis. The roof according to the invention only needs two guide rails, one for each rear end of the roof part. In this manner room and weight are spared.

The roof according to the invention has in spite of its small mass considerable structural rigidity and offers when closed the same comfort as a permanently closed coupe. It takes up little space, operates easily and simply, and does not restrict rearward view.

BRIEF DESCRIPTION OF THE DRAWING

The invention is more closely described in the following with reference to two embodiments. Therein.

SPECIFIC DESCRIPTION

Figure 1:
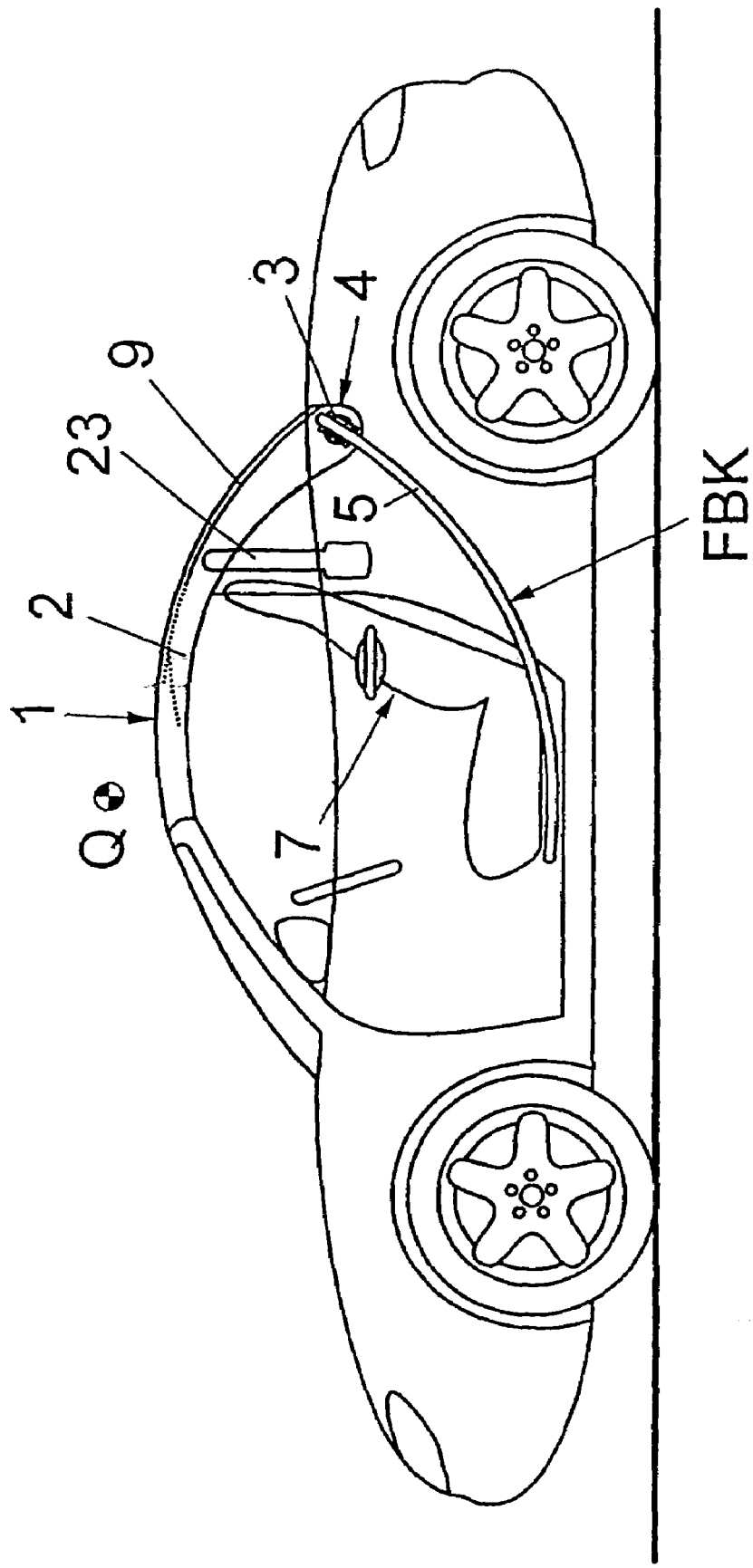
FIG. 1 is a longitudinal section through a two-seater convertible with the roof up and a circularly arcuate guide.

FIG. 1 shows by way of example a two-seater convertible having according to the invention a roof 1. It is comprised of a main roof part 2 shaped as an arcuate rigid shell and having rear ends 3 forming support arms extending along the line of the arc of the roof part 2. The lower ends of these support arms are each connected to a guide slide 4 pivotal about a horizontal transverse axis and carrying rollers or slide pads. The guide slides 4 ride on rigid double-T-rails 5 or square-section rails that are mounted on upright support plates 6 (see FIG. 2) extending parallel to the vehicle longitudinal axis and fixed on the vehicle body. Each rear end 3 is guided by a respective slide 4 on a respective rail 5. The rails 5 are of low-friction construction with a hard surface.

Figure 2:
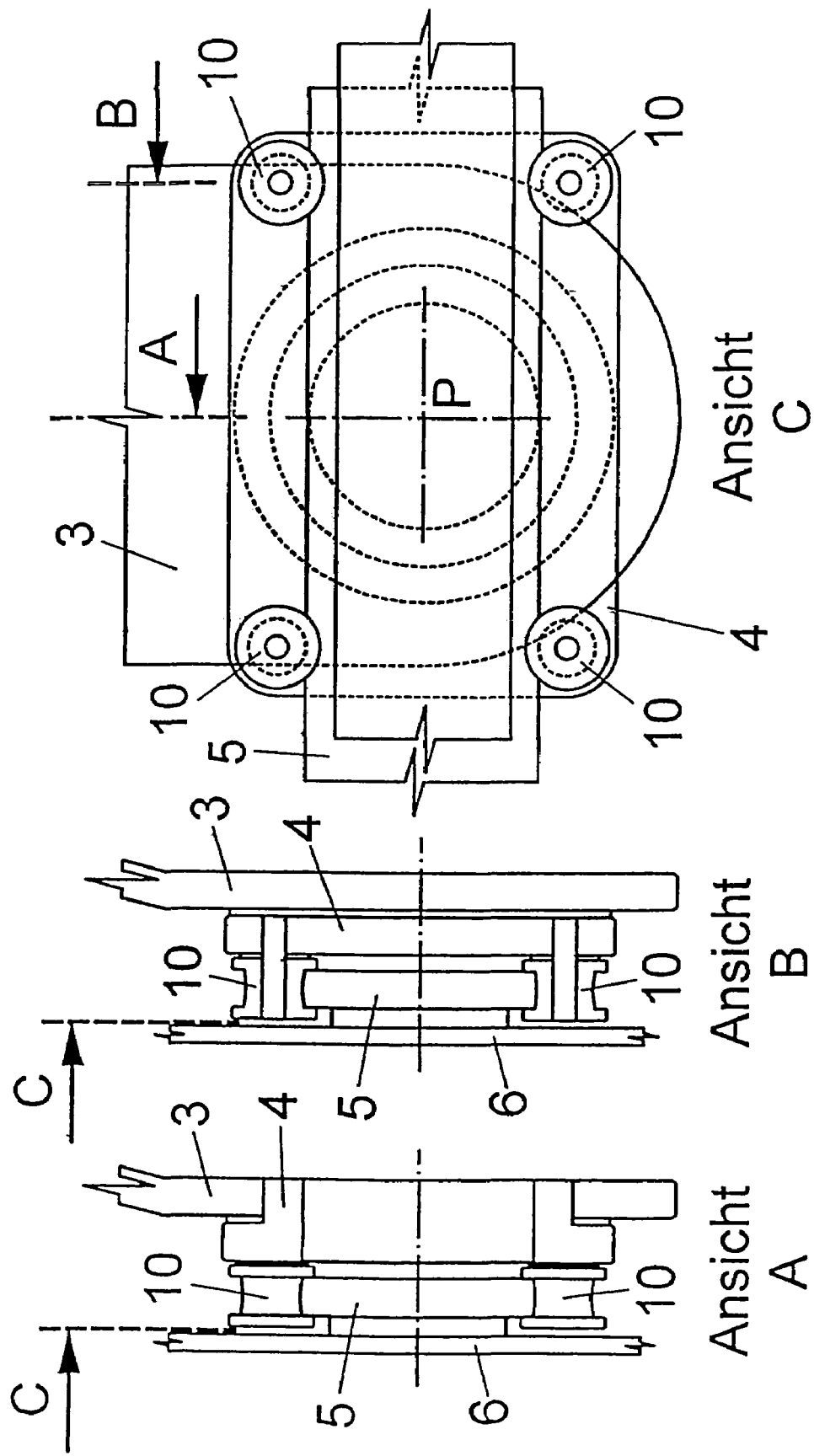
FIG. 2 is a variant of the guide slide with four rollers in end and side views.

FIG. 2 shows the compact arrangement of one the guide slides 4 with four rollers 10 that roll on the rail 5. The rails 5 extend along guide paths FBK (FIG. 1) centered on a horizontal transverse axis Q. The axis Q is outside the vehicle. The two rails 5 extend behind the seats 7 into a storage compartment 8 (see FIG. 3) that extends along the movement curve of the roof part 2 when being lowered or raised. The roof 1 engages with its front edge on an upper frame of the windshield. The roof 1 is moved by standard drives and can be operated wholly automatically.

Figure 3:
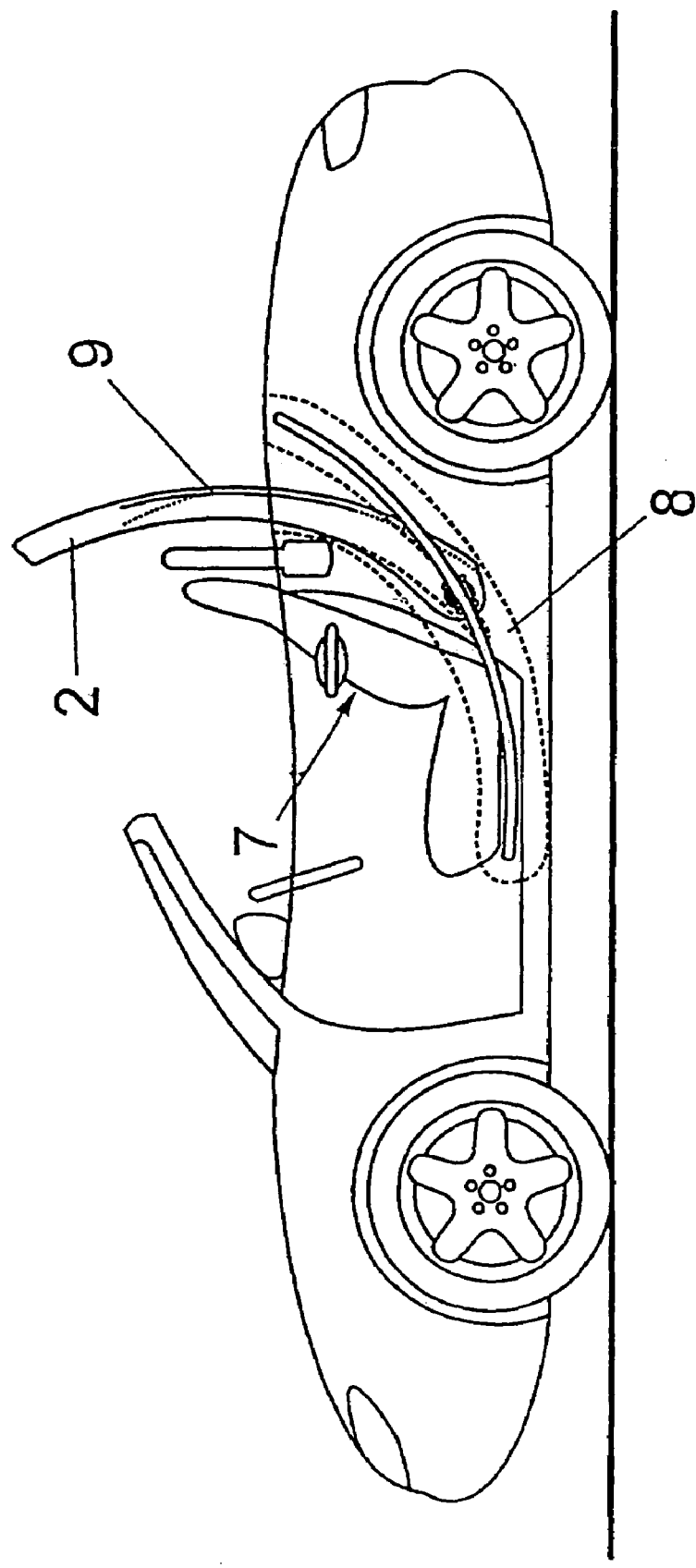
FIG. 3 is a longitudinal section through the convertible at the start of the lowering operation.
Figure 4:
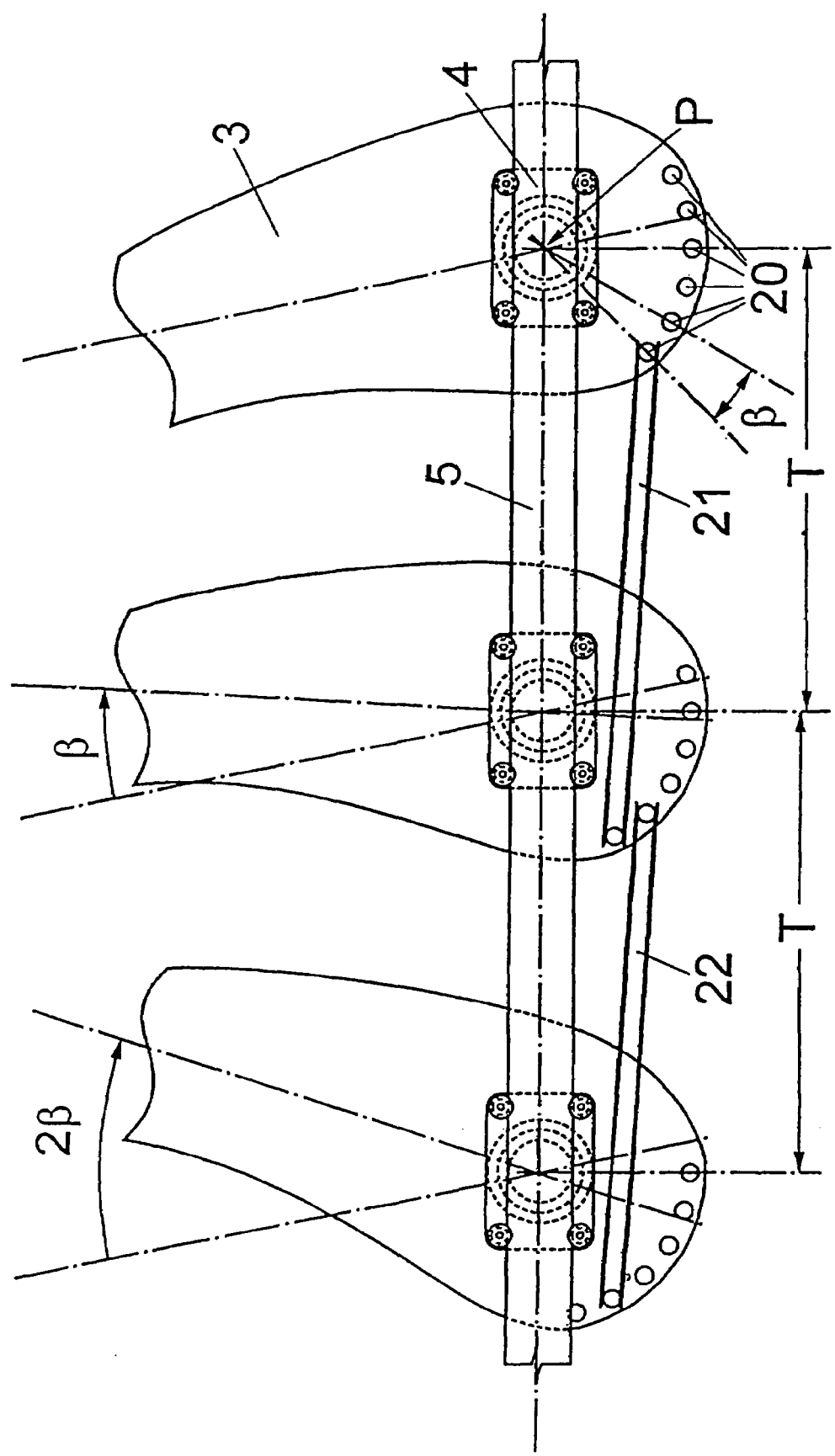
FIG. 4 shows the pivotal guiding of the roof.

FIG. 3 shows the roof 1 at the start of the movement of the roof 1 down into the storage compartment 8. As a result of the arcuate shape of the shell of the roof 2 it lifts from the upper edge of the windshield. Synchronously with movement along the rails 5, the roof 2 is pivoted about an axis P that extends through the slides. FIG. 4 shows for simplicity's sake in a straight guide-rail part how, in order to guide it as simply and easily as possible, the roof 2 rides via pins 20 in track grooves 21 and 22 in the rails 5 on the support plates 6 largely without play. The pins 20 are set on a circle centered on the slide axis P and offset angularly by the angle β from one another. As it moves along a stretch T the track groove 21 pivots the roof 2 through the angle β. Then as the guided pin 20 leaves its track 21 the next following pin 20 engages in the next track 22 in order to continue pivoting the roof 2. The pivoting tracks in this embodiment are shaped as trochoids. The trochoid shapes vary slightly from a straight line and can in fact be made as straight lines to hold down production costs. With a circularly arcuate guide rail 5 the shapes of the guide tracks 21 and 22 are correspondingly circularly arcuate. Changing the shapes can produce different pivoting speeds.

Figure 5:
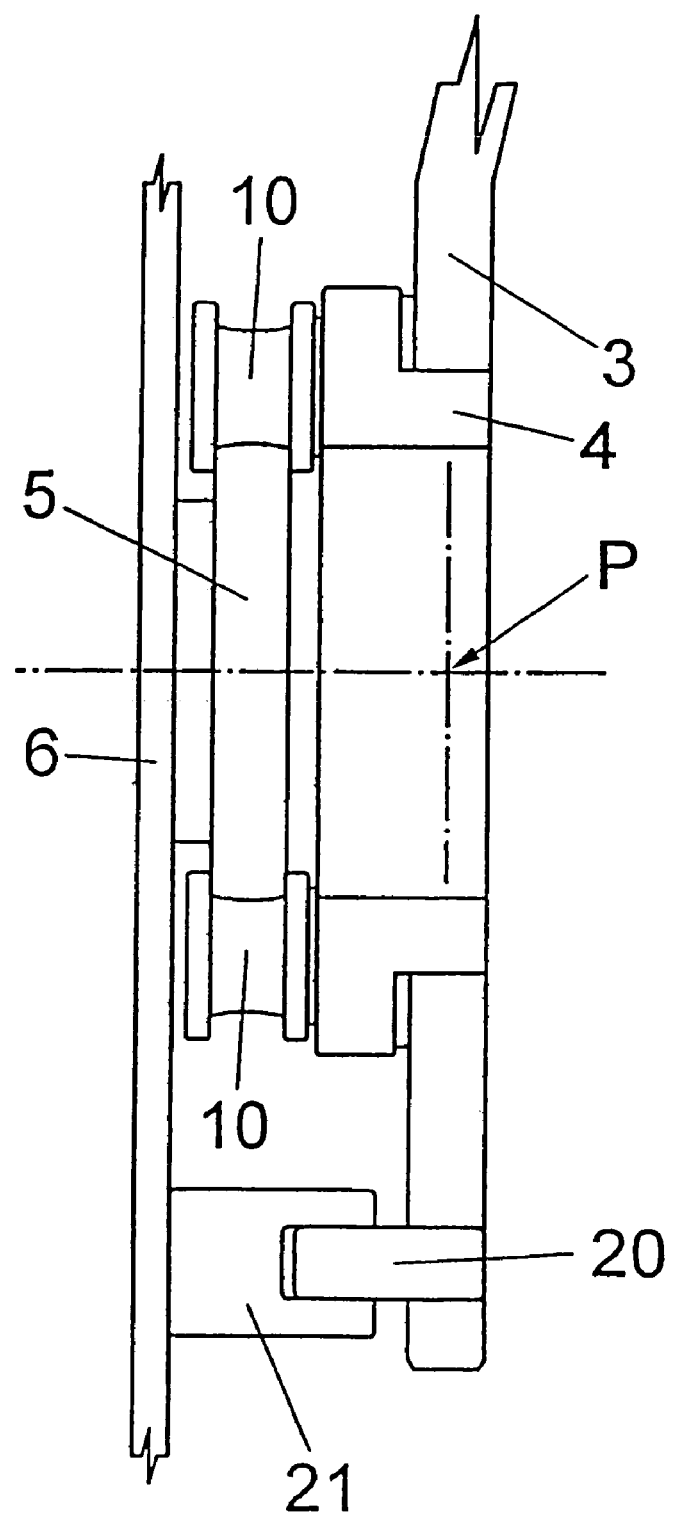
FIG. 5 is a view of a guide slide with a pivot according to FIG. 4.
Figure 6:
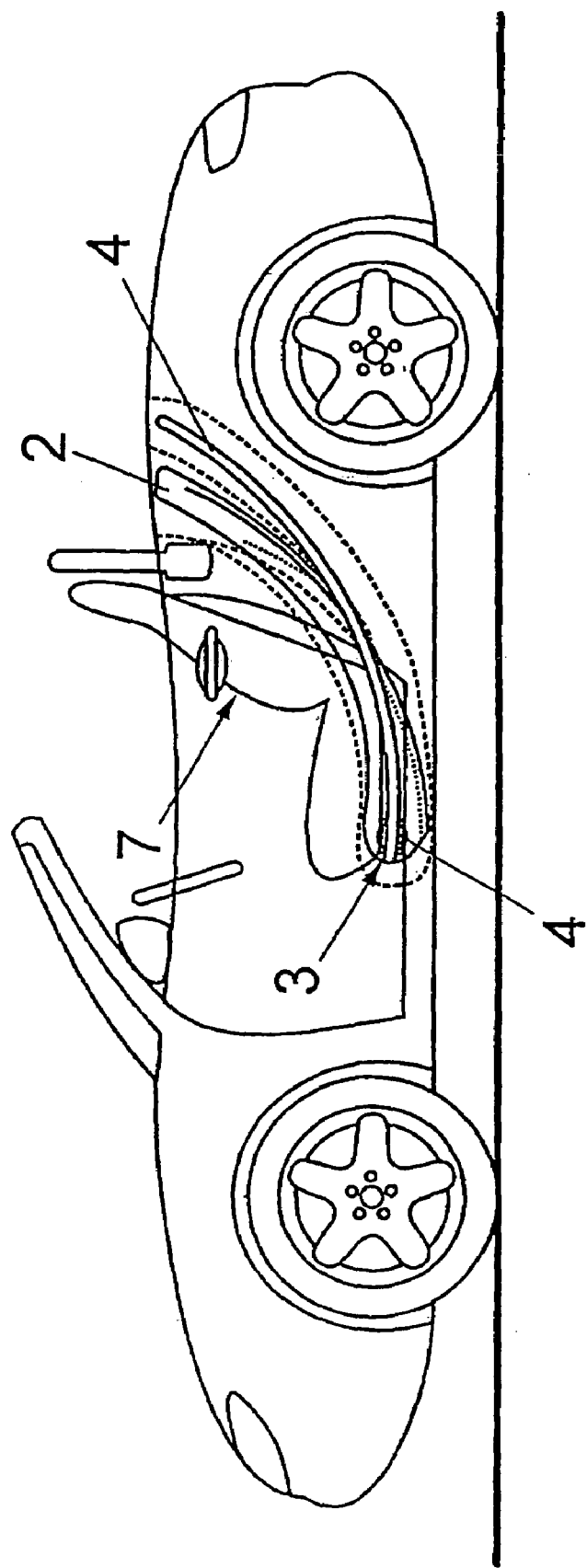
FIG. 6 is a further longitudinal section through the car at the end of the lowering operation.

FIG. 5 shows the slide 4 which is guided on the rail 5 by means of the pin 20 engaging in the track 21. When being lowered, the rear ends 3 of the roof part 2 as shown in FIG. 6 travel along the circularly arcuate guide FBK past the roll bar 23 into the end position. The rear ends 3 pass on the rails 5 laterally past the seats 7. The roof part 2 is positioned after being lowered in a somewhat angled position behind the back of the seats 7 in the storage compartment 8.

Figure 7:
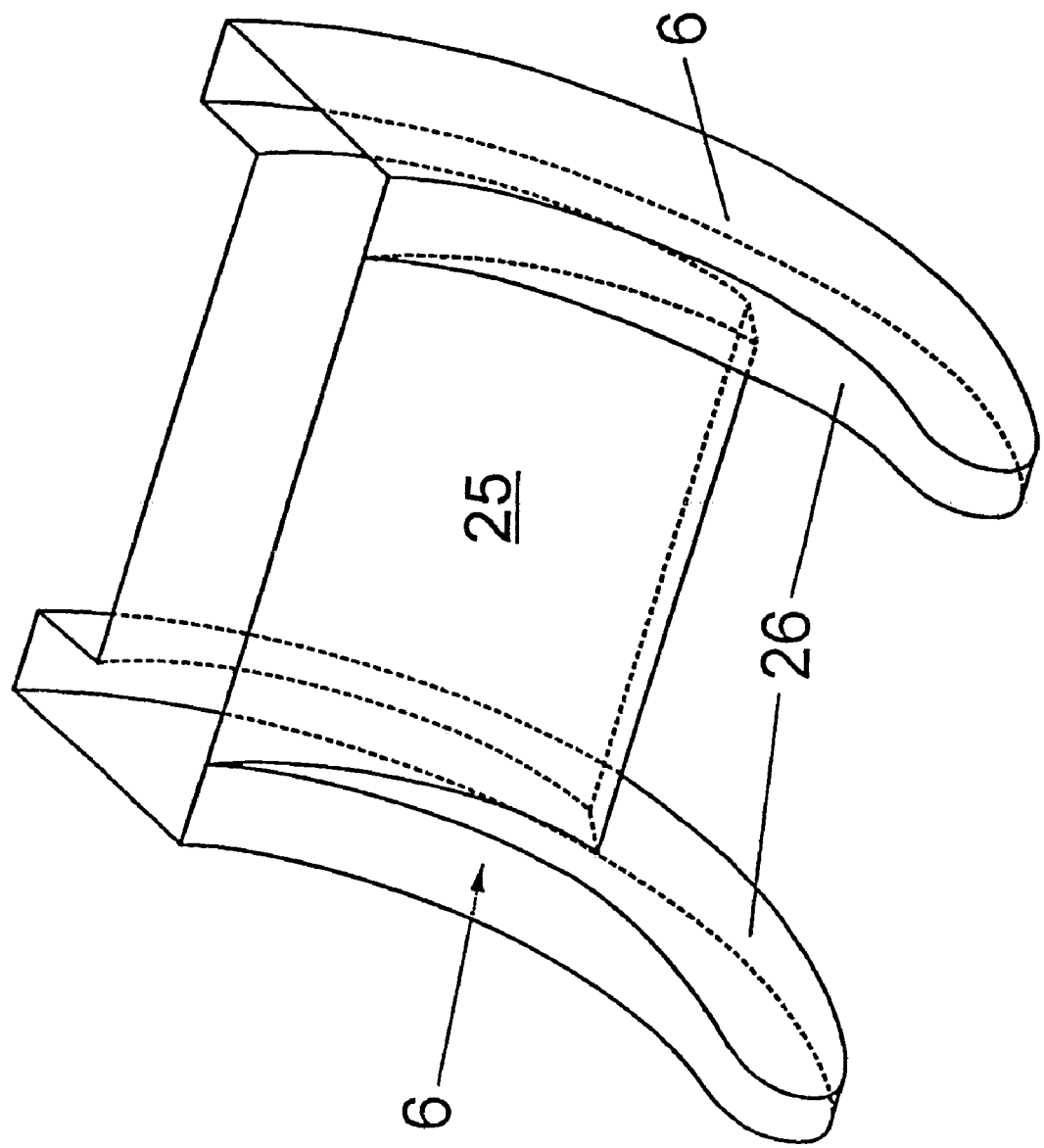
FIG. 7 is a perspective view of the storage compartment for the roof.

FIG. 7 is a perspective view of the storage compartment that is comprised of a central space 25 and two side spaces 26. The side spaces 26 accommodate the rear ends 3 and the center space the roof shell 2. The center space 25 is quite compact so that there is room for a drive element below this central space 25.

Figure 8A:
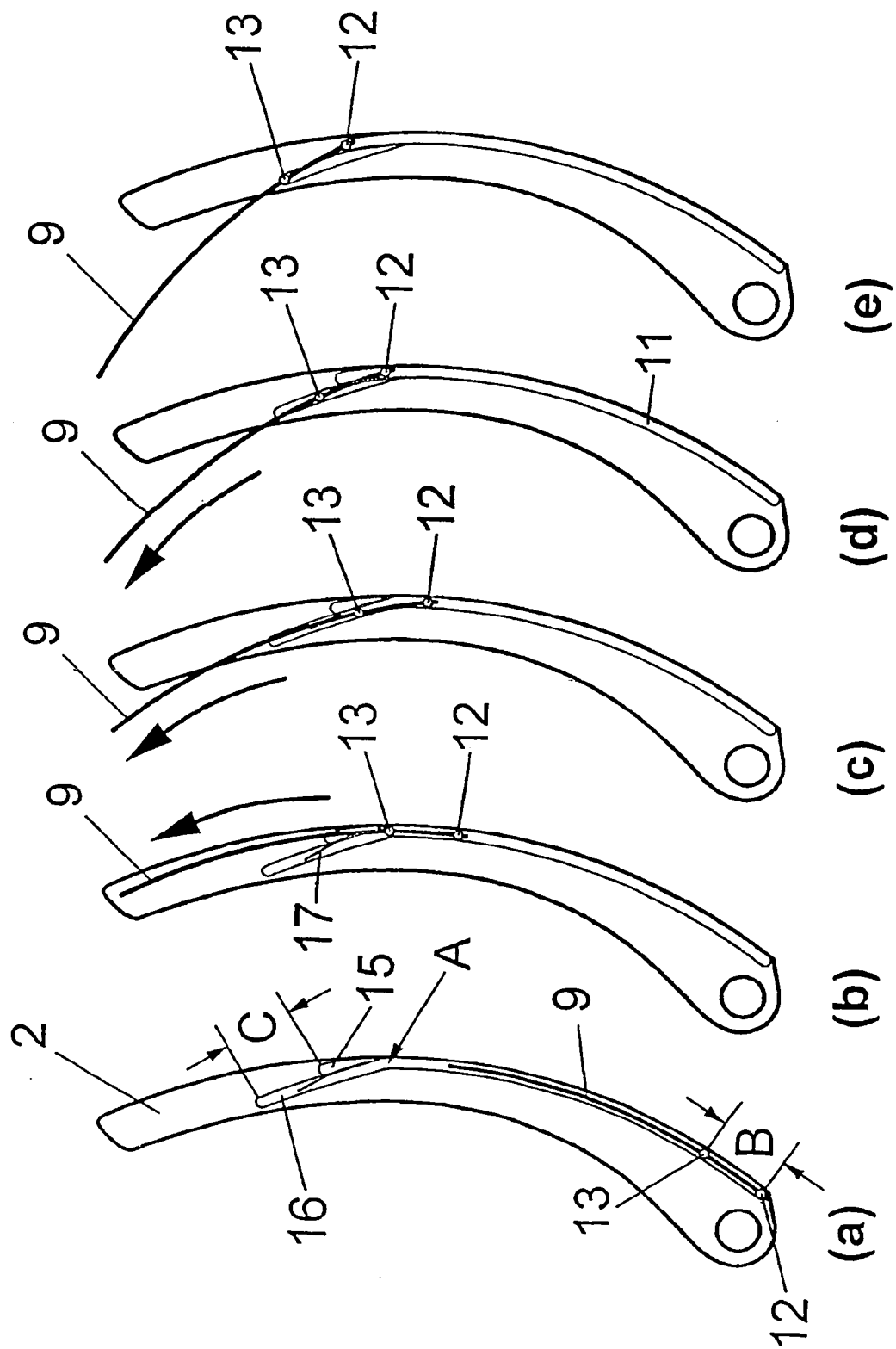
FIG. 8*a* is a longitudinal section through the roof part with integrated rear window showing movement at (a) through (e) during extension of the rear window.

The rear window 9 as shown in FIG. 8*a* is integrated into the roof part 2 and has a circularly arcuate or rotation-symmetrical shape like that of the roof part 2. The rear window 9 can slide tightly underneath the roof surface and drop down in two parallel guide slots 11 by means of pins 12 and 13. The guide slots 11 are formed inside the roof shell along side edges of the roof shell. They split near their upper ends into a guide section 15 that follows the arc of the roof part and a guide section 16 extending into the vehicle interior. Their intersection A is provided with a spring-like deflector plate 17 that traverses the guide section 16. The pins 12 and 13 are held by a frame and are spaced apart by a distance B that corresponds to a spacing C of the two guide sections 15 and 16 at their upper ends. The spring-like deflector plate 17 has at the intersection 15 a length that is smaller than the spacing B of the guide pins 12 and 13.

Figure 8B:
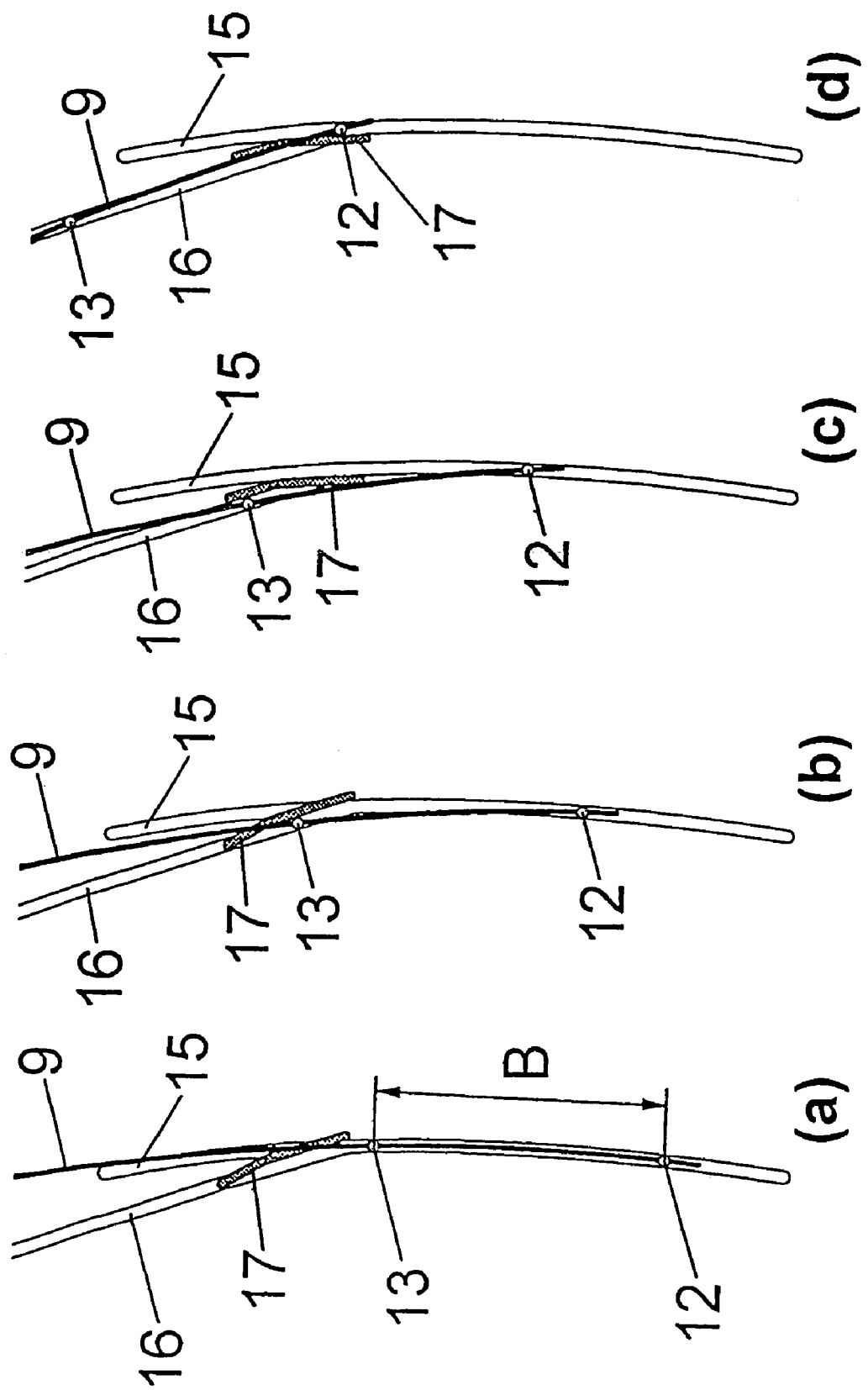
FIG. 8*b* is an enlarged view of the movement according to FIG. 8*a* as the rear window is being extended.

When moved outward, the rear window 9 slides via the pins 12 and 13 in the guide slots 15, with the pin 12 tracking in the inwardly extending guide section 16 and moving therein into its end position. Since as shown in FIG. 8*b* in larger scale the pin 13 is deflected by the spring-like plate 17, the section 15 is left clear for the pin 12. The rear window 9 is erected and assumes a windscreen position. When moved inward, the rear window 9 tracks in an opposite sequence of movements.

Figure 9:
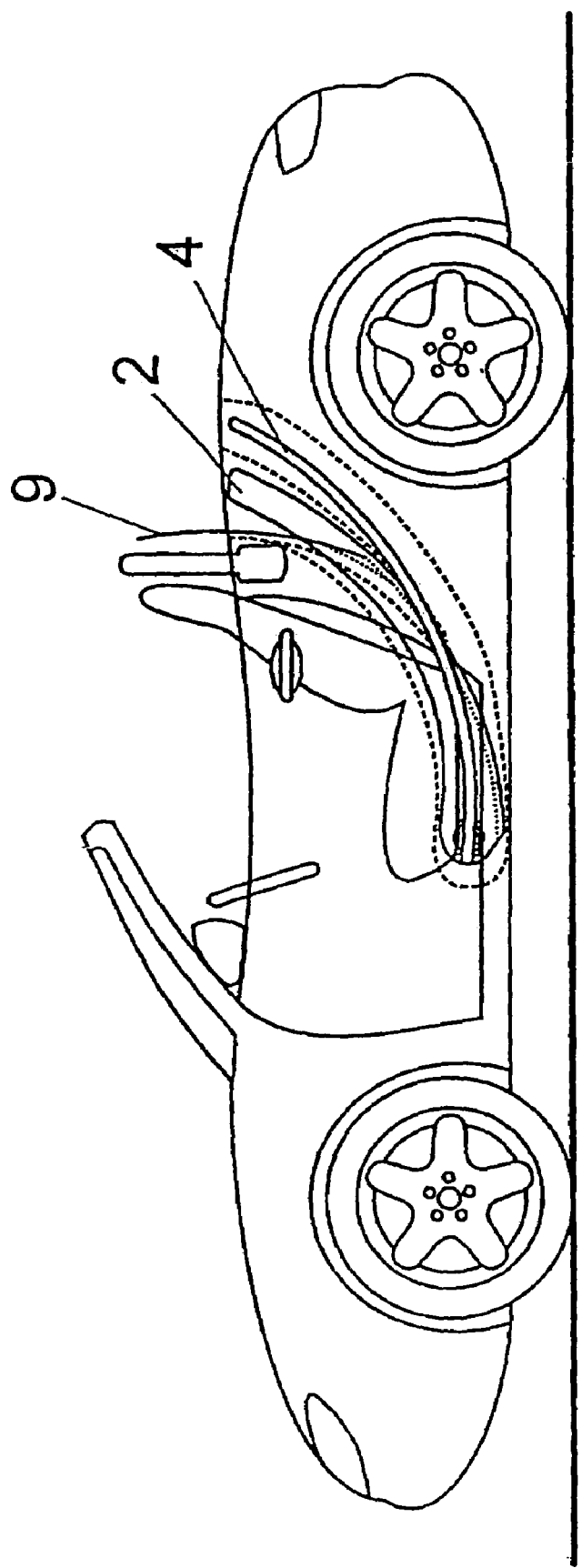
FIG. 9 is a longitudinal section through a two-seater convertible with the roof lowered and the rear window raised to the windscreen position.

FIG. 9 shows the rear window 9 extended as a windscreen. The rear window 9 is lightly circularly arcuate or rotation symmetrical to a horizontal transverse axis of the convertible. Its concave side is turned toward the interior of the vehicle. When the roof 2 is up it presses the rear window 9 against seals that are provided on roof and car-body surfaces. The rear window 9 can also alternatively be provided with an annular seal.

Figure 10:
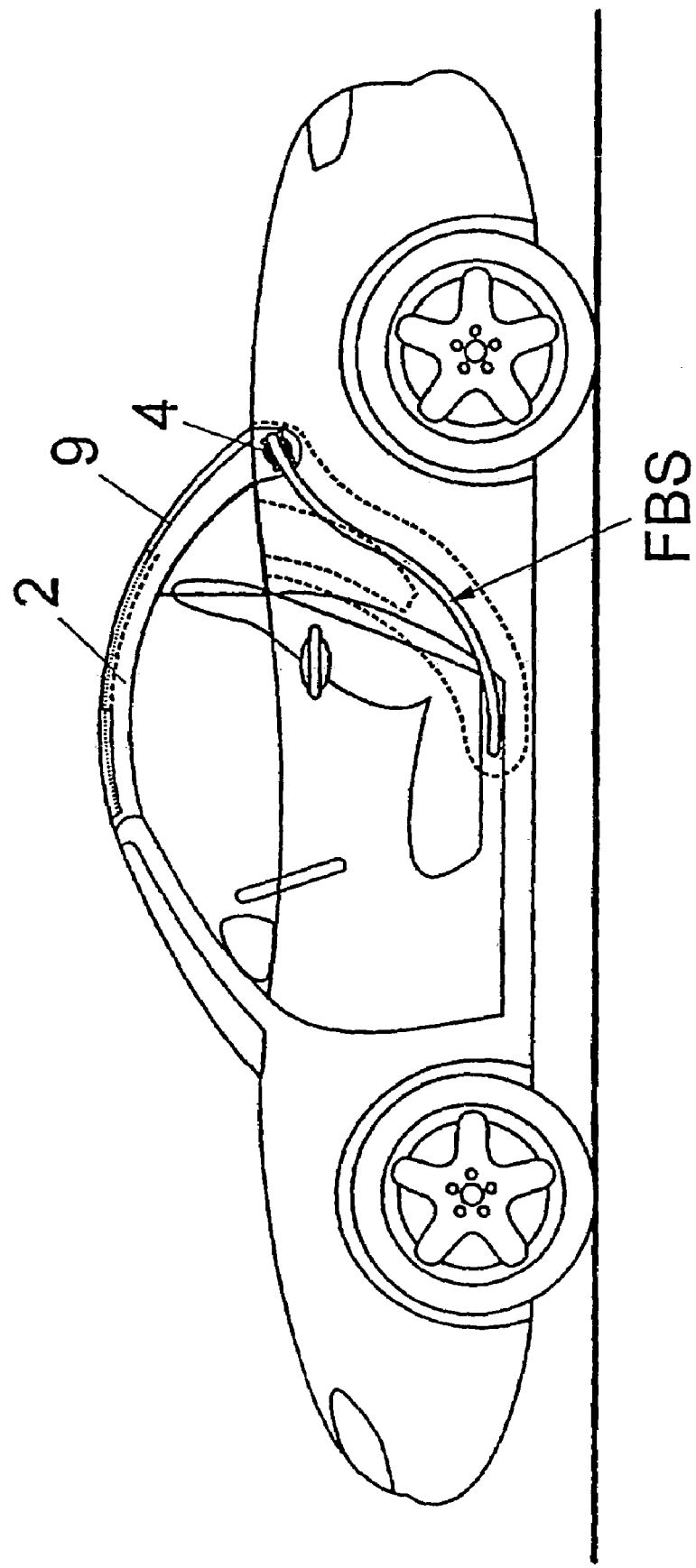
FIG. 10 is a longitudinal section through a two-seater convertible with an S-shaped guide and the roof up with an integrated roll bar.

FIG. 10 is a longitudinal section through a two-seater convertible with an S-shaped guide FBS for the roof part 2. The rear window 9 in this example is guided like a slide roof in the roof shell so that it can extend to the front roof edge.

It is guided in two arcuate tracks in upright planes parallel to the vehicle longitudinal axis in the roof shell. In order to make the mechanism as compact as possible, the rear window 9 is made rotation symmetrical about a horizontal transverse axis of the vehicle and can in a simplified embodiment be planar and flat from side to side. It thus has the shape of a cylindrical surface segment.

Figure 11:
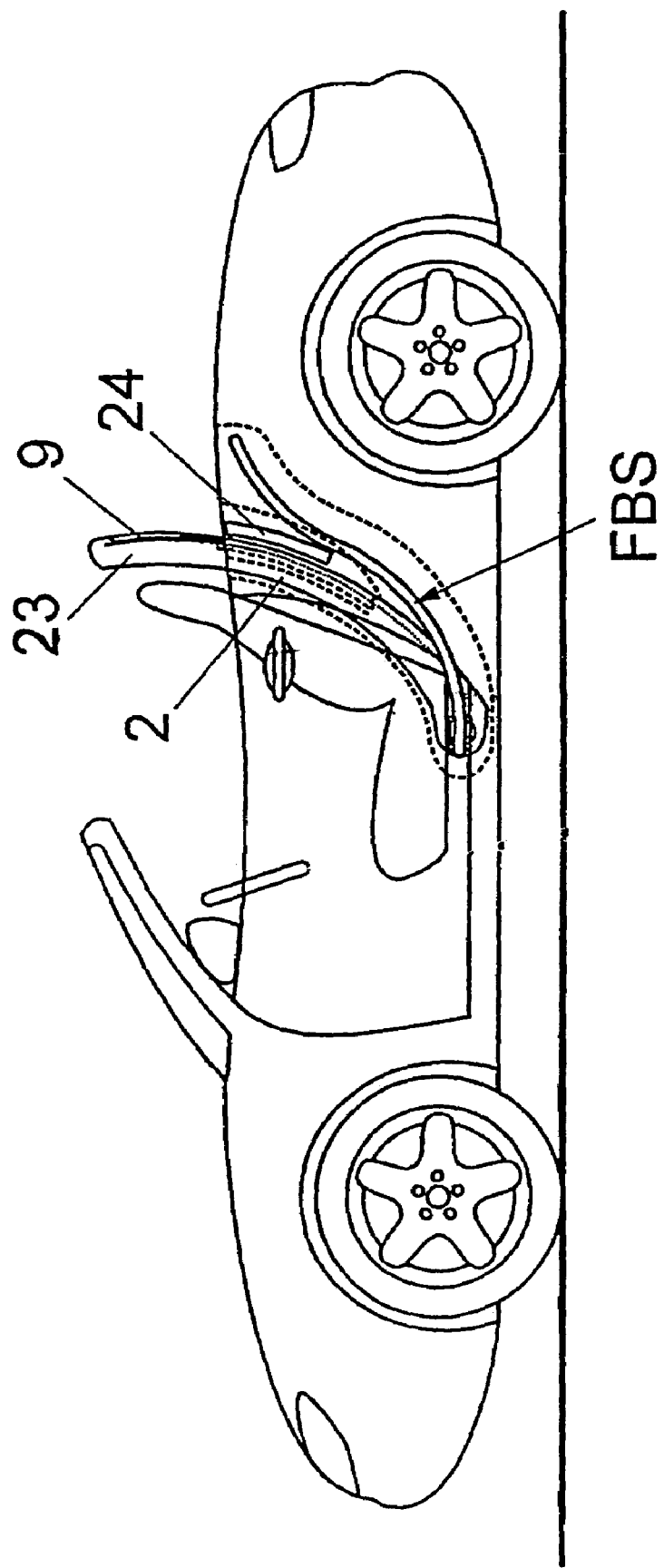
FIG. 11 is a longitudinal section through a two-seater convertible with an S-shaped guide and the roof down with an integrated roll bar.
Figure 12:
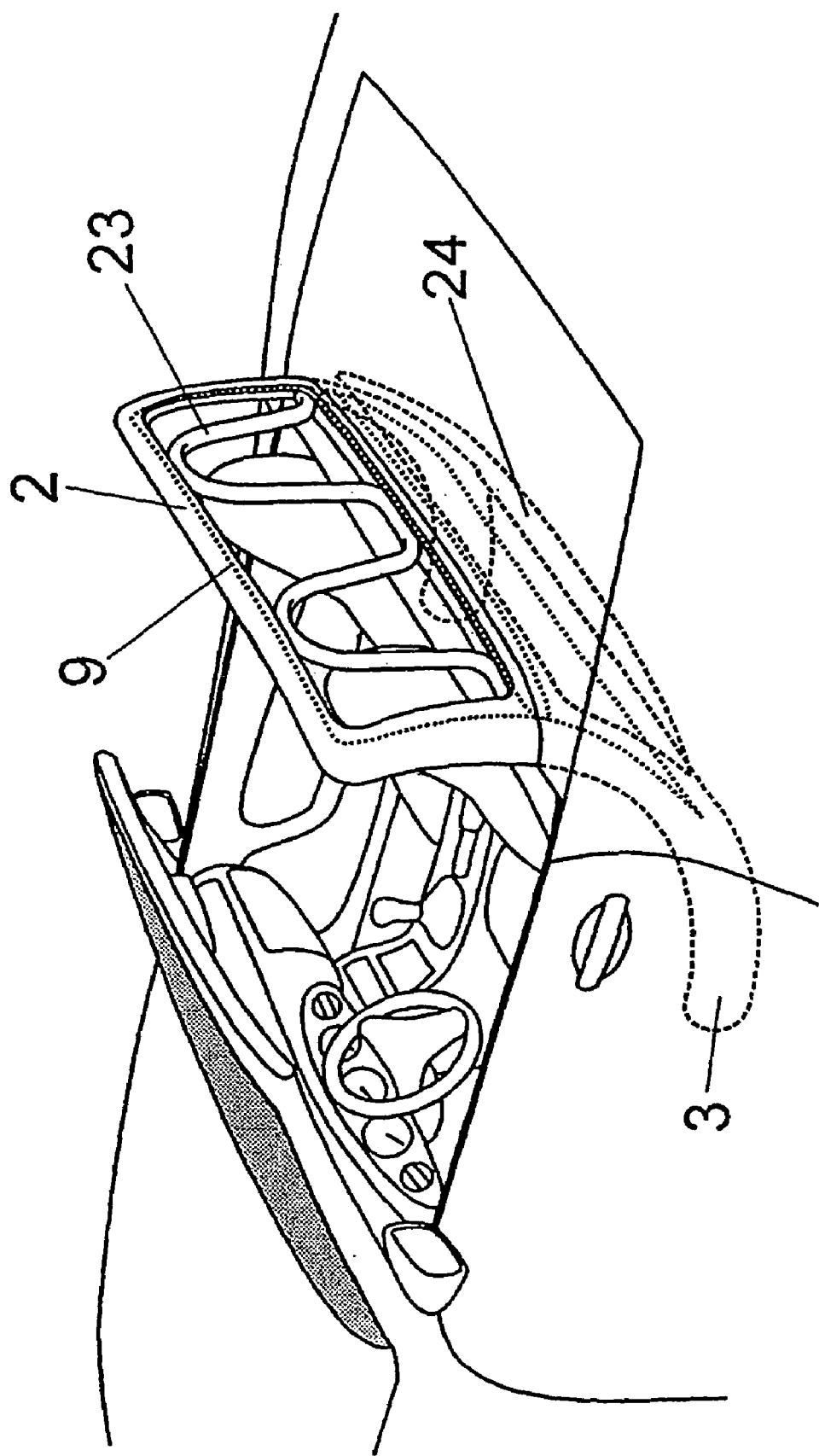
FIG. 12 is a perspective view of a two-seater convertible with an S-shaped guide and the roof down with an integrated roll bar.

A roll bar 23 is integrated into the front edge of the roof. As shown in FIG. 11 when the roof is lowered its front part still projects up out of the storage compartment. A cover 24 is slid over the roof and extended into the storage compartment to leave rearward sight lines clear. The rear window can be brought in this roof opening into a windscreen position. FIG. 12 shows a perspective view of the roof when down.

The invention claimed is:

1. In a convertible motor vehicle adapted to move in a normal travel direction and having a seat and a trunk behind the seat, the improvement comprising:
    a storage compartment extending transversely of the direction behind the seat and forward of the trunk and extending laterally of the seat in the direction forward past the seat;
    an arcuate and rigid roof shell having two rear end posts defining a rear opening;
    guide rails laterally spacedly flanking the seat and extending from the compartment in the direction forward past the seat;
    respective guide slides on the rear end posts and riding on the guide rails, the roof shell being displaceable along the guide rails between an up position wholly out of the storage compartment and a down position wholly in the compartment with the guide slides laterally flanking the seat; and
    a rear windshield displaceable between a lowered position in the storage compartment and a raised position fitting between the rear end posts of the windshield in the up position thereof and closing the rear opening.

2. The improvement defined in claim 1 wherein the guide rails are arcuately curved.

3. The improvement defined in claim 2 wherein the guide rails are generally S-shaped.

4. The improvement defined in claim 1, further comprising:
    drive means including a motor attached to the roof shell for displacing same between the up and down positions.

5. The improvement defined in claim 1 wherein the windshield is arcuate and the windshield and roof have generally the same radii of curvature.

6. The improvement defined in claim 5 wherein the windshield is generally part-cylindrical and centered on a horizontal axis extending transversely of the direction and convex toward a passenger compartment forward in the direction of the seat.

7. The improvement defined in claim 1 wherein the windshield is displaceable into its raised position when the roof is in the down position so as to project upward behind the seat outside of the compartment.

8. The improvement defined in claim 1, further comprising
    a seal engageable between a periphery of the windshield and the roof shell in the up position of the roof and raised position of the windshield.

9. The improvement defined in claim 1 wherein the roof shell is arcuate and the compartment is shaped complementarily to the roof shell.

10. The improvement defined in claim 1 wherein the roof shell has a front edge provided with a roll bar, the roll bar projecting upward behind the seat in the down position of the roof shell.

11. The improvement defined in claim 1 wherein the rails are rigid and have hardened surfaces.

12. The improvement defined in claim 1 wherein the guide slides have rollers riding on the respective rails.

13. The improvement defined in claim 1 wherein the slides are pivotal on the respective roof end posts.

14. The improvement defined in claim 1 wherein the windshield is pivoted on the vehicle.

15. The improvement defined in claim 1 wherein the windshield is recessed in the vehicle in the lowered position.

* * * * *